Patented Mar. 8, 1927.

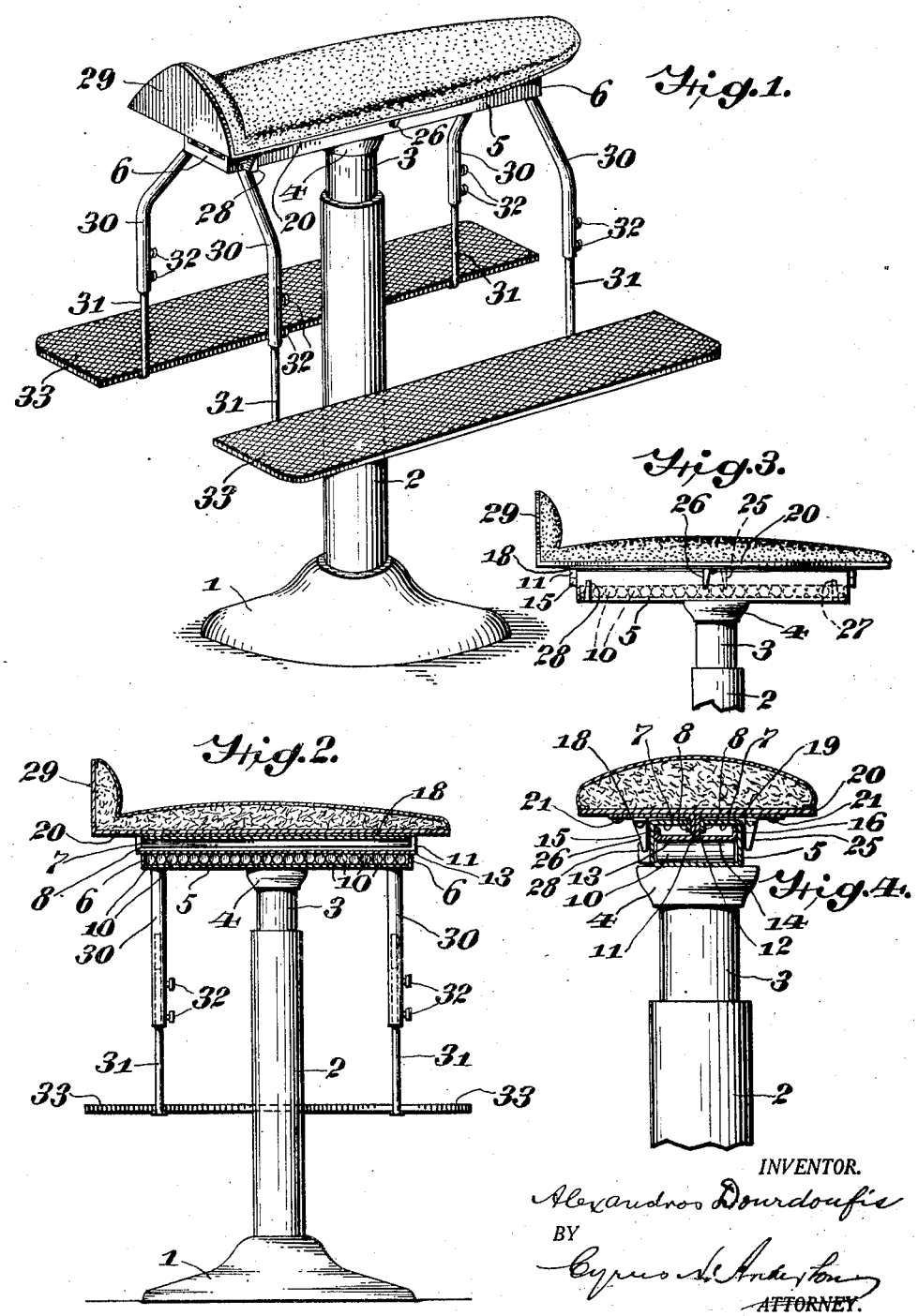

1,620,448

UNITED STATES PATENT OFFICE.

ALEXANDROS DOURDOUFIS, OF PHILADELPHIA, PENNSYLVANIA.

SADDLE SEAT.

Application filed April 10, 1925. Serial No. 22,031.

My invention relates to saddle seats and it has for its general object to provide a seat of such character which is adapted for use by barbers, dentists, and others engaged in like occupations, whereby it shall not be necessary for them to stand at all times during the period in which they may be at work.

It is also an object of the invention to provide a saddle seat embodying novel means the presence of which renders such seats practical for use by barbers, dentists, and others engaged in like occupations during the periods in which they are at work.

A further object of the invention is to provide a saddle seat of novel construction provided with means whereby the said seat may be moved back and forth transversely of its support in order that it may be more suitable for use by barbers, dentists, and others engaged in like occupations.

Another object of the invention is to provide a novel construction of saddle seat including a seat portion and foot-rest portions which are adjustably related to each other.

Other objects and advantages of the invention will be pointed out in the detailed description thereof which follows or will be apparent from such description.

In order that the invention may be readily understood and its practical advantages fully appreciated reference may be had to the accompanying drawing in which I have illustrated one form of a convenient embodiment of the invention. However, it will be understood that the invention is susceptible of embodiment in other forms of construction than that shown and that changes in the details of construction may be made within the scope of the claims without departing from the principle of the invention.

In the drawing:

Fig. 1 is a view in perspective of a saddle seat structure embodying the invention;

Fig. 2 is a vertical sectional view taken in a central vertical plane extending longitudinally of the seat;

Fig. 3 is a view in side elevation of the seat portion of the said structure and of a portion of the support therefor; and Fig. 4 is a transverse vertical section of the said seat portion, with a portion of the support therefor in elevation.

Referring to the drawing:

1 designates a base upon which a support or column 2 is mounted. The base and support 2 are rigidly connected together. An extension 3 is telescopically mounted in the upper portion of the support or column 2 and is adapted to rotate relatively thereto. Means may be provided, if desired, whereby the portion 3 may be elevated and lowered with respect to the portion 2. This is a common feature in constructions of this character and I have not illustrated the same in the drawing, because it constitutes no part of the present invention. The extension 3 terminates at its upper end in a head 4.

The saddle seat structure embodying my invention comprises as a whole a base element or member 5 which is of rectangular trough shape in cross section. Its opposite ends are closed by means of upturned flanges 6. The opposite sides of the member 5 are provided with inwardly and horizontally extending flanges 7, the inner edges of which terminate in downwardly extending narrow flanges 8 which are arranged in spaced parallel relation to each other, as best shown in Fig. 4 of the drawing. A plurality of anti-friction bearings 10 are mounted within the member 5 upon the bottom thereof, as shown. These bearings may be of any preferred form, but in the construction as illustrated the bearings are of the roller form or type.

For the purpose of slidably supporting the seat element of the saddle seat structure I have provided the slidable member which, in the construction as shown, comprises two plate elements having intermediate portions 11 and 12 which are secured together by riveting, spot welding, or in any other suitable manner. The lower edges of the portions 11 and 12 are provided with laterally extending flanges 13 and 14 which terminate at their outer edges in upwardly extending narrow flanges 15 and 16. The portions 11 and 12 in the assembled structure are located between the adjacent opposing flanges 8, and the portions 13, 14, 15 and 16 are located within the rectangular trough shaped base portion 5. The bottom sides of the flanges 13 and 14 rest upon the upper sides of the bearings 10, while the upper edges of the flanges 15 and 16 rest against and in slidable relation to the undersides of the flanges 7. The inner edges of the flanges 8 are located in adjacent relation with respect to the upper sides of the inner edges of the flanges 13 and 14. The upper edges of the portions 11 and 12 are provided with outwardly extending horizontal flanges 18 and 19. These flanges extend outwardly over the tops of the flanges 7. It will be seen that the base portion 5 and the seat carrying portion supported upon the bearings 10 are interlocked with each other and that the interlocking is of such character that there may be relative sliding movement between the two parts.

A plate 20 is secured by means of screws 21, or otherwise, to the flanges 18 and 19. A cushion 22 is secured to the upper side of the plate 20.

In order to limit the relative sliding movement between the cushion supporting part of the structure and the base portion 5 I have provided a depending stop projection 25 upon one side of the cushion carrying portion of the structure and a depending stop projection 26 upon the opposite side thereof. The stop projection 25 is mounted upon the flange 18, while the stop projection 26 is mounted upon the flange 19. These stop projections may be located about midway of the length of the seat, as shown. An upwardly extending stop projection 27 is mounted adjacent the forward end of one side of the base 5 with which the stop 25 is adapted to contact upon movement of the slidable seat portion of the structure forwardly. A stop projection 28 is mounted upon the opposite side of the base member 5 adjacent the rear end thereof. The stop 26 is adapted to contact with the stop 28 when the seat portion of the structure is moved to the rear. The presence of these stops prevents disconnection of the base and seat or cushion portions of the saddle seat structure when these parts are moved slidably with respect to each other, either forwardly or rearwardly. The plate 20 is provided upon its rear end with an upturned flange-like portion 29, which is cushioned, as indicated. The upwardly extending cushion portion constitutes means for preventing a person from sliding backwardly off the seat.

Upon the removal of either of the stops 27 or 28, or 25 or 26, the slidable seat portion may be disengaged from the base portion. The ability to effect such removal is desirable, because it enables the separation or disconnection of the parts for the purpose of renewing the anti-friction bearing elements and also for the purpose of facilitating the fastening or securing of the base member 5 to the head 4 upon the part 3 of the column support for the saddle seat structure. The base portion or element 5 of the saddle seat structure may be secured in any preferred known manner to the head 4.

In order to provide means whereupon a person using the seat may rest his or her feet I have secured depending tubular supports 30 to the base member 5 of the seat structure adjacent its opposite ends. Rods 31 telescope into the lower ends of the tubular supports 30 and are adapted to be held in adjusted position by means of binding screws 32. Foot-rests or boards 33 are secured to the lower ends of the adjustable rods 31. A person sitting astride of or straddling the seat may rest his or her feet upon the foot-rests or boards 33. These rests or boards are connected at their inner edges to the lower ends of the supporting rods 31 and extend laterally or horizontally therefrom. By connecting the supports 31 to the inner edges of the boards 33 it will be apparent that the said supports do not interfere with the placing of the feet at any points desired upon the boards.

It will be seen that by my invention I have provided a saddle seat structure in which the cushion or seat portion is adapted to be moved either forward or backward with respect to the supporting base portion thereof and that the rests or boards for the feet are of a length such that portions thereof are always in proper relative position with respect to the slidable portion of the seat to permit the placing and the resting of the feet thereon.

Having thus described my invention, what I claim and desire to secure by Letters Patent is:

1. A saddle seat structure comprising, in combination, a hollow base member the sides of which are provided with flanges which extend inwardly toward each other, the inner edges of the said flanges being spaced from each other, anti-friction bearings located in and supported on the bottom of said base member, a slidable member having an intermediate portion which fits within and slides between the spaced edges of the said flanges, and the said slidable member having oppositely extending flanges at its lower side which bear upon the said anti-friction bearings and also having oppositely extending flanges at its upper side which project over and are spaced from the inwardly extending flanges of the said base member, and a seat member secured to the flanges at the upper side of said slidable member.

2. A saddle seat structure comprising, in combination, a base portion, a seat portion, means for slidably interlocking the said portions, and foot-boards adjustably supported upon the opposite sides of the said base portion.

3. A saddle seat structure comprising, in combination, a base portion, a seat portion, anti-friction bearings mounted within the said base portion upon which bearings the seat portion is supported, means for retaining the said seat portion in position upon the said base portion, and foot-boards located upon the opposite sides of the structure, said boards being supported upon the said base portion.

4. A saddle seat structure comprising, in combination, a base portion adapted to be mounted upon a suitable support therefor, said base portion being of rectangular trough shape in cross section, anti-friction bearing elements mounted in the bottom of said base portion, a seat portion having a bearing part extending into the said base portion and resting upon the said bearings, means for retaining the said seat portion upon the said base portion, means for limiting the relative sliding movements between the said base and seat portions, and foot-boards suspended from the opposite side edges of the said base portion.

5. A saddle seat structure comprising, in combination, a base portion having sides and inwardly extending flange portions, anti-friction bearing elements mounted in the said base portion underneath the said flange portions, a cushion supporting member slidably mounted upon the said base portion, said cushion supporting member having a portion which rests upon the said anti-friction bearing elements, means for limiting the back and forth movements of the said cushion supporting portion, foot-boards located at the opposite sides of said structure, and adjustable means for connecting the said foot-boards to the opposite sides of the said base portion.

In testimony that I claim the foregoing as my invention, I have hereunto signed my name this sixth day of April, A. D., 1925.

ALEXANDROS DOURDOUFIS.